Feb. 4, 1958  J. F. LEAHY ET AL  2,821,764
PLASTIC GROMMETS AND A METHOD FOR FORMING THEM
Filed March 11, 1954
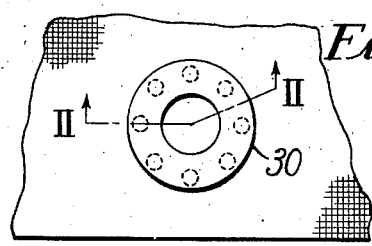
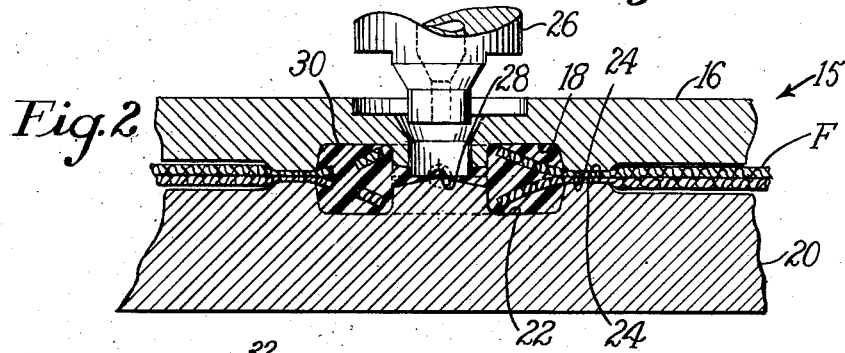
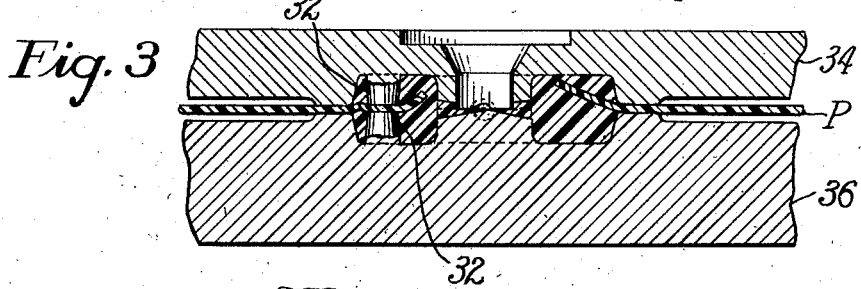
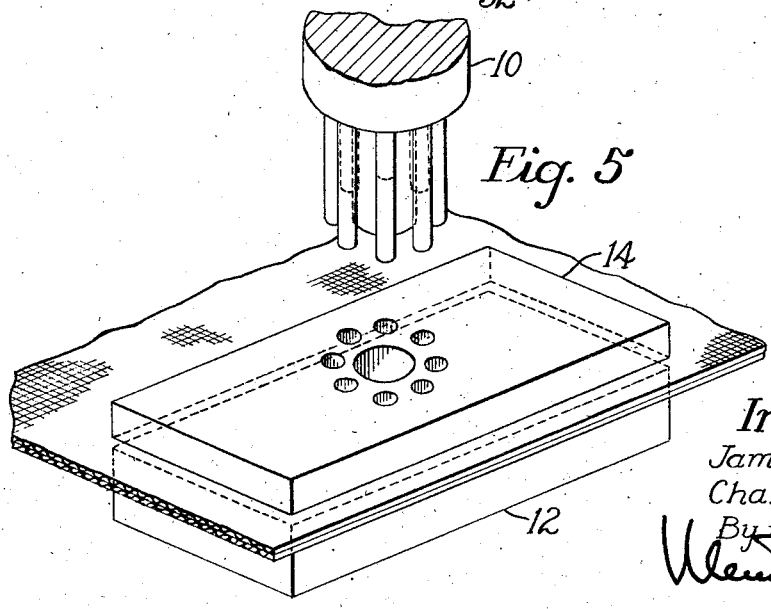
Inventors
James F. Leahy
Charles B. Noonan
By their Attorney

United States Patent Office 2,821,764
Patented Feb. 4, 1958

2,821,764

PLASTIC GROMMETS AND A METHOD FOR FORMING THEM

James F. Leahy, Beverly, and Charles B. Noonan, Newburyport, Mass., assignors to United Shoe Machinery Corporation, Flemington, N. J., a corporation of New Jersey Application March 11, 1954, Serial No. 415,654

4 Claims. (Cl. 24—142)

The present invention relates to reinforcements for holes in sheet material and more particularly to articles known as grommets and in one of its novel aspects relates to a dielectric insulator assemblage.

Metal grommets similar to eyelets but having enlarged flanges have long been used to reinforce holes in tents and other articles of canvas or other fabrics. The inherent weakness of metal grommets has long been recognized as evidenced by the fact that it is customary practice to fold the sheet material so that the grommet is actually inserted into two or more layers of material. Furthermore, it has been found necessary in many instances additionally to reinforce holes, as for example, in sails by a stitching process in order to get sufficient reinforcement. The primary reason for this is that a small portion only of the load is taken by the washer part of the grommet so that the eyelet part exerts a highly concentrated load on the edge of the fabric surrounding the hole. Some types of metal grommets in which prongs are formed around the outer periphery of the washers provide slight better holding power but the disadvantage of this is likewise self-evident for the prongs which are of narrow section pierce the sheet material and concentrate any load which is applied on a small area. Metal grommets are normally employed for attachment to fabric and their disadvantages are even more apparent when they are used to reinforce holes in plastic sheet material such as is used in shower curtains. The nature of the plastic material is even more unsuited for reinforcement by these metal grommets because of the low tear resistance of the plastic material.

Furthermore, while metals are available today which will withstand corrosion and other forms of chemical attack, their widespread use in many desirable applications is made impractical because of the high cost of material involved.

An object of this invention is to provide an improved grommet formed of a plastic material for reinforcing holes in sheet material.

A further object of the invention is to provide an improved method of forming and attaching plastic grommets to sheet material.

The present invention overcomes the above-mentioned disadvantages of metal grommets by forming a plastic grommet in sheet material in a manner having greater strength characteristics than has hitherto been attained. In addition, plastic grommets provide a simple and economical means for improving the appearance of the hole reinforcement either by molded designs or by the use of coloring agents in the plastic material. In either event the use of plastic eliminates a step which is otherwise necessary to produce a metallic equivalent. A further advantage is gained when a plastic grommet is formed on metallic sheet material according to the features of the present invention in that a superior dielectric assemblage is produced.

In accordance with the various features of the present invention, flexible sheet material having a hole formed therein and preferably having a number of smaller holes arranged adjacent to and surrounding this hole is clamped between molds having annular cavities on either side of the sheet material and in communication with the hole or holes. Fluid plastic is then injected under pressure radially of said hole and in substantially the same plane as the sheet material to form the grommet. The grommet thus formed comprises an annular flange on each side of the flexible sheet material which flanges are interconnected by an integral plastic barrel and also preferably by several interconnecting legs passing through the sheet material adjacent the barrel, the flexible sheet material being deflected out of its normal plane thereby increasing the holding power of the grommet. In the case of extremely flexible material it has been found that this deflection is at times so great that the material will be forced to the surface of the mold cavity in an undesirable manner. Therefore, we have provided within the mold cavity clamping means which limit this deflection thereby enabling us to attach plastic grommets to plastic sheet material such as is used in fabricating shower curtains.

Our grommet therefore gains its superior strength from several features. First, it gains strength from the interconnecting legs of plastic of round section which distribute any load over the large area of the holes in the sheet material through which they pass; secondly, from the deflection of flexible sheet material from its normal plane within the body of the grommet and thirdly, in the case of woven materials, there is a penetration of the interstices of the fabric which produces a superior mechanical bond between the grommet and the fabric. Thus any load applied to the grommet is distributed over a large area of sheet material.

The above and other features of the present invention will now be more particularly described by reference to the accompanying drawings and pointed out in the claims.

In the drawings,

Fig. 1 is a view in plan of the grommet of the present invention attached to canvas;

Fig. 2 is a view in section taken along line II—II in Fig. 1 and on an enlarged scale with molding means also being shown in section;

Fig. 3 is a view similar to Fig. 2 showing the grommet attached to plastic sheet material and with the mold modified for this application;

Fig. 4 is a section through a grommet attached to a metal sheet; and

Fig. 5 is a diagrammatic showing of means for punching the necessary holes in the sheet material.

As a preliminary step to forming the present grommet, it is necessary to punch or otherwise form a hole in the sheet material to which the grommet is to be attached. Also it is preferable to form a plurality of smaller holes in spaced relation immediately adjacent this hole. Means for punching are shown, by way of example, as a multipronged punch 10 in Fig. 5 which is adapted to coact with a shear plate 12 and stripper plate 14.

After the holes are formed the sheet material is placed in a mold 15 (Fig. 2), which comprises an upper member 16 having an annular cavity 18 and a lower member 20 having similar cavity 22. The proportions are such that when the sheet material is placed in the mold with its hole concentric with the cavity, the cavity is in communication with all of the holes. A clamping pressure is exerted on the fabric compressing it between faces 24 of the molds. A thermoplastic composition, such as a high molecular weight polyamide resin which is commercially available under the name nylon is then injected under pressure through a tube 26 (shown in a raised position), through gates 28 into the mold cavities. The tube 26 is then retracted to the position shown in Fig. 2 and the flash or gate is trimmed after removal from the mold so that a grommet 30 is formed in the manner illustrated in Fig. 2. It will be noted that the gates 28 extend radially of the hole and are in substantially the same plane as the work piece when it is clamped in the mold. Thus when the plastic is injected, to form a grommet on flexible sheet material, illustrated as two layers of fabric F in Fig. 2, the upper layer of the fabric is deflected upwardly and the lower layer downwardly. The grommet thus formed has superior gripping power attributable to three factors. First, there is a mechanical bond due to this deflection. Second, the plastic extending through the smaller holes in the fabric forms a further mechanical bond and third, the plastic penetrates the interstices of the fabric to insure an even greater mechanical bond.

Essentially, the same method and mold may be employed to form a grommet on a piece of metal sheet material M as is illustrated in Fig. 4. This grommet formed in such sheet material is of particular utility as a dielectric insulator where it is desired to pass electric conduits through the walls of a radio chassis for example.

When attaching these grommets to very flexible sheet material, it is necessary to provide some supporting means for the portion of the sheet material which extends into the mold cavity. Otherwise when the plastic is injected, the sheet material will be deflected to one surface or the other of the mold cavity so that the plastic will not be formed on both sides of the sheet material. To prevent this, supporting pins 32 (Fig. 3) are provided in the mold cavity. It has been found preferable to use only half the number of interconnecting holes in the sheet material and to provide supporting pins 32 between each of the holes which are formed. Thus, a piece of plastic sheet material P, such as polyethylene, is placed in molds 34, 36 after having been punched on apparatus similar to that shown in Fig. 5. The plastic material is injected in a manner similar to that described above to form a plastic grommet. On plastic sheets of this type there are two factors which provide a bonding means. First, the interconnecting legs of plastic connecting the two annular sections form a mechanical bond and more important the plastic sheeting is deflected by the force of the injection into a tortuous configuration by actually being stretched or elongated in unsupported portions thereby affording an effective mechanical bond. There is little or no chemical bond, by way of fusing, due to the rapid cooling of the plastic material in the grommet. Furthermore, a chemical bond is highly undesirable since any plasticizing of the sheet material would reduce the area immediately adjacent the grommet and thus weaken the whole structure. The plastic grommets thus formed are particularly adaptable for use on shower curtains and other articles of manufacture where it is necessary to attach a fastening to a plastic sheet.

Holes reinforced by grommets in accordance with the present invention are far superior to their metallic counterparts. It is possible to fashion grommets on canvas, for example in the proportion shown in Fig. 2, and upon subjecting such grommet to a tension test the fabric will rupture at its full rupture strength.

In addition to its other advantages the plastic grommet may be easily fashioned in a decorative manner by forming designs or other inscription within the mold cavities 18, 22; an end result which would require an additional stamping operation in the metal grommet. Also the use of a plastic grommet enables the easy and rapid selection of any color which is desired, by the addition of coloring agents into the plastic. This will give a permanent color surface which is far superior to any paint or enamel application which might be made to a metal grommet.

Having thus described our invention, what we claim as new and desire to secure by Letters Patent of the United States is

1. An article of manufacture comprising a plastic grommet formed on two or more layers of flexible sheet material, said grommet comprising two annular sections one on each side of said sheet material, said sections being interconnected by an integrally formed barrel and by integrally formed legs surrounding and adjacent to said barrel, said barrel and legs passing through holes in said sheet material, at least one layer of said sheet material being deflected toward the outer surface of one of said annular sections and another layer of material being deflected toward the outer surface of the other of said annular sections.

2. The method of forming plastic grommets on flexible sheet material which comprises the steps of introducing sheet material having a hole formed therein, between the upper and lower members of a mold, said members having opposed annular cavities which are concentric with said hole, clamping said sheet material between said members and injecting radially and outwardly of said hole and in substantially the same plane as the sheet material plastic material under pressure into said cavities thereby to deflect the sheet material within the plastic material.

3. The method of forming plastic grommets on flexible sheet material which comprises the steps of introducing, between the upper and lower members of a mold, sheet material having a hole formed therein and a number of smaller holes surrounding said hole, said members having opposed annular cavities which are concentric with said hole and in communication with the smaller holes, clamping the sheet material between said members and injecting radially and outwardly of said hole and substantially in the same plane as the sheet material plastic material under pressure into said cavities thereby to deflect the sheet material within the plastic material.

4. The method of forming plastic grommets on flexible sheet material which comprises the steps of introducing sheet material having a hole formed therein between the upper and lower members of a mold, said members having opposed annular cavities which are concentric with said hole, clamping the sheet material between said members, supporting the sheet material within said cavity, and injecting radially and outwardly of said hole and in substantially the same plane as the sheet material plastic material under pressure into said cavities thereby to deflect the sheet material within the plastic material.

References Cited in the file of this patent

UNITED STATES PATENTS

| | | |
|---|---|---|
| 584,354 | Hawkins | June 15, 1897 |
| 612,848 | Kempshall | Oct. 25, 1898 |
| 2,291,545 | Ganz et al. | July 28, 1942 |
| 2,343,983 | Knowlton | Mar. 14, 1944 |
| 2,393,984 | Gookin | Feb. 5, 1946 |
| 2,440,144 | Hosking | Apr. 20, 1948 |
| 2,471,258 | Bolton | May 24, 1949 |
| 2,516,086 | Winterhalter | July 18, 1950 |
| 2,565,753 | Botwinick | Aug. 28, 1951 |
| 2,580,668 | Franz | Jan. 1, 1952 |
| 2,586,978 | Murray | Feb. 26, 1952 |
| 2,663,905 | Van Riper et al. | Dec. 23, 1953 |

FOREIGN PATENTS

| | | |
|---|---|---|
| 860,699 | Germany | Dec. 22, 1952 |
| 908,933 | Germany | Apr. 12, 1954 |